United States Patent
Kojima et al.

(10) Patent No.: US 6,203,091 B1
(45) Date of Patent: Mar. 20, 2001

(54) SEAT DEVICE FOR A VEHICLE

(75) Inventors: Yasuhiro Kojima; Yukifumi Yamada, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/397,131

(22) Filed: Sep. 16, 1999

(30) Foreign Application Priority Data

Sep. 16, 1998 (JP) .................................................. 10-261803

(51) Int. Cl.$^7$ ...................................................... B60N 2/06
(52) U.S. Cl. ........................................ 296/65.13; 296/65.05
(58) Field of Search ................................ 296/65.05, 65.13

(56) References Cited

U.S. PATENT DOCUMENTS

| 2,179,085 | * | 11/1939 | De Rose . | |
|---|---|---|---|---|
| 3,189,312 | * | 6/1965 | Bilancia . | |
| 3,317,175 | * | 5/1967 | Ford . | |
| 3,476,435 | * | 11/1969 | Hitzelberger . | |
| 4,281,871 | * | 8/1981 | Grittner et al. | 296/65 R |
| 5,234,189 | * | 8/1993 | Myers | 248/429 |
| 5,368,355 | * | 11/1994 | Hayden et al. | 296/65.1 |
| 5,372,398 | * | 12/1994 | Aneiros et al. | 296/65.1 |
| 5,487,583 | * | 1/1996 | Ikegaya et al. | 296/65.1 |
| 5,868,451 | * | 2/1999 | Uno et al. | 296/66 |

FOREIGN PATENT DOCUMENTS

| 0 102 708 | 3/1984 | (EP) . |
|---|---|---|
| 0 372 338 | 6/1990 | (EP) . |
| 0 561 518 | 9/1993 | (EP) . |
| 0 677 421 | 10/1995 | (EP) . |
| 6-55961 | 3/1994 | (JP) . |

* cited by examiner

Primary Examiner—D. Glenn Dayoan
Assistant Examiner—Mickki D. Murray
(74) Attorney, Agent, or Firm—Burns, Doane, Swecker & Mathis, LLP

(57) ABSTRACT

A vehicle seat device includes a lower rail fixed on a vehicle floor, a seat supporting member slidably supported on the lower rail and possessing a flat portion at its front upper part and a flange extending inwardly at its rear part, and a seat cushion frame having horizontal flat portions. The horizontal flat portions are set on and spot-welded to the flat portion and the flange.

15 Claims, 3 Drawing Sheets

SEAT DEVICE FOR A VEHICLE

This application is based on and claims priority under 35 U.S.C. §119 with respect to Japanese Application No. 10(1998)-261803 filed on Sep. 16, 1998, the entire content of which is incorporated herein by reference.

FIELD OF THE INVENTION

The present invention generally relates to a vehicle seat. More particularly, the present invention pertains to a vehicle seat provided with a fixture mechanism for fixing between seat supporting members and seat frames.

BACKGROUND OF THE INVENTION

Unexamined Published Japanese Patent Application (Kokai) No. Hei 6-55961 discloses a seat device that includes a pair of lower rails fixed on a vehicle floor, a pair of upper rails which slide on the lower rails, and lower frames which are fixed with a seat cushion frame (or pan) and which are also fixed to the upper rails by bolts. On the seat assembly line, a floor side member unit which includes a lower rail and an upper rail are fixed by bolts with a seat side member which includes a lower arm.

In this known type of seat device, overlapping portions exist between the floor side member unit and the seat side member for purposes of effecting the bolt fixing. This inevitably increases the seat width dimensions. Also, the bolt fixing process adds time to the assembly process, and the parts management associated with the bolt and nut fixation brings about increased costs.

In light of the foregoing, a need exists for a seat device that is not susceptible to the same disadvantages and drawbacks as other known seat devices.

SUMMARY OF THE INVENTION

In light of the above, the present invention provides a vehicle seat device that includes a lower rail fixed on a vehicle floor, a seat supporting member slidably supported on the lower rail and possessing a flat portion at its front upper part and a flange extending inwardly at its rear part, and a seat cushion frame having horizontal flat portions. The horizontal flat portions are set on and spot-welded to the flat portion and the flange.

According to another aspect of the invention, a seat device mounted in a vehicle includes a lower rail fixed on a vehicle floor, a seat supporting member slidably supported on the lower rail and possessing a flange extending towards one side of the seat supporting member, and a seat cushion frame having a horizontal flat portion. The horizontal flat portion of the seat supporting member is set on and welded to the flange.

In accordance with a further aspect of the invention, a seat device mounted in a vehicle includes a lower rail fixed on a vehicle floor, a seat supporting member slidably supported on the lower rail and possessing a flange extending towards an outer side of the seat supporting member, with the flange being provided with a skirt portion possessing clips. A seat cushion frame is fixed to the seat supporting member and a seat pad is positioned on the seat cushion. The seat cushion cover is provided with elements that engage the clips on the skirt of the flange.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
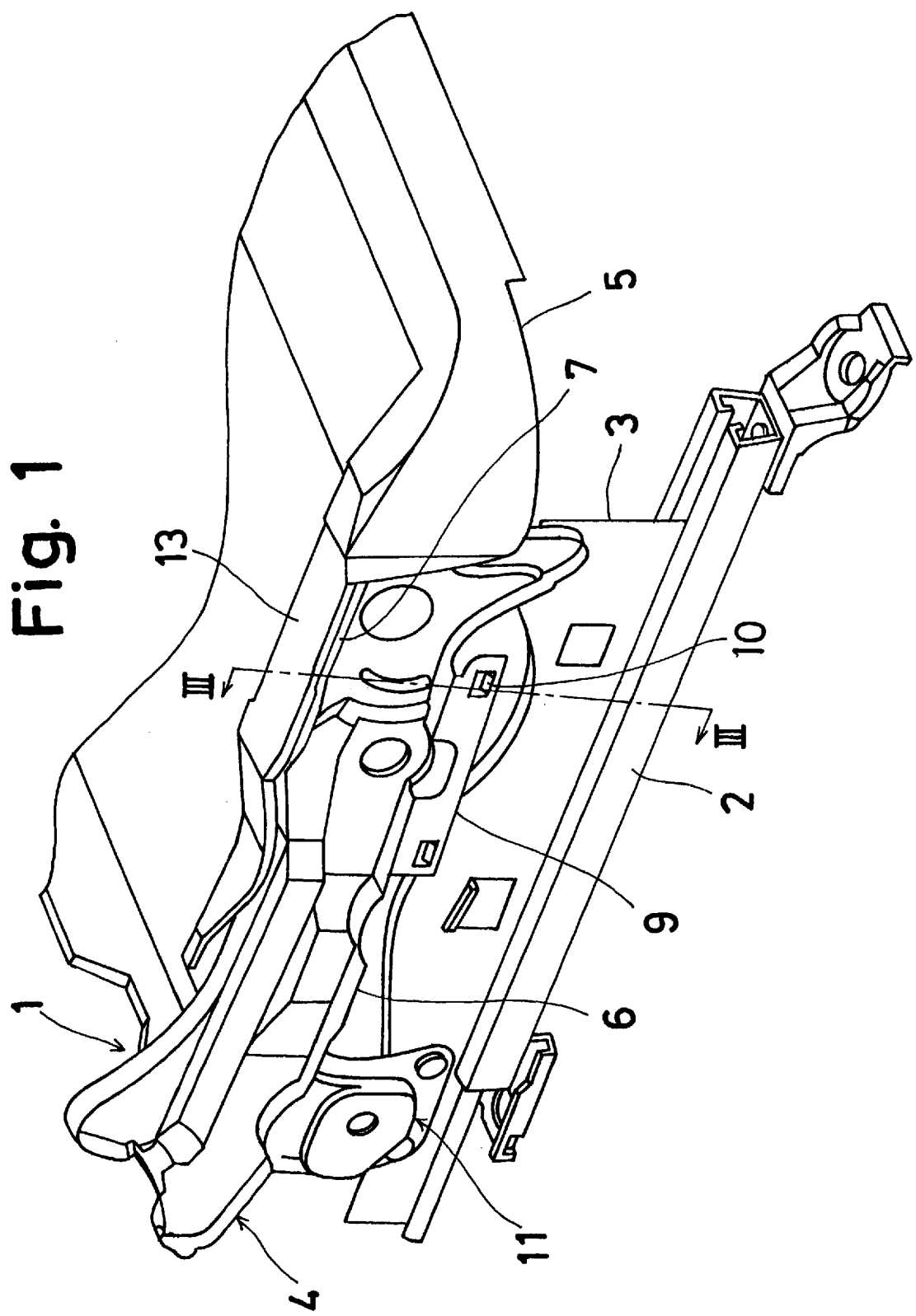
FIG. 1 is a perspective view of a part of seat frame in accordance with the present invention.

As shown in FIG. 1, the seat device 1 according to the present invention includes a pair of oppositely positioned lower rails 2, a pair of oppositely positioned upper rails 3 which each slide on a respective one of the lower rails 2, a pair of lower arms 4 each fixed to a respective one of the upper rails 3 by bolts or rivets, and a seat cushion frame (or pan) 5 welded to the pair of lower arms 4. The figures illustrate only one of the lower rails and only one of the upper rails located on one side of the seat cushion frame. It is to be understood however that the other lower rail and upper rail are located on the opposite side of the seat cushion frame.

A seat supporting member is constituted by a combination of the upper rail 3 and the lower arm 4 located on one side of the seat cushion frame. In this embodiment, the upper rail 3 is separate from and fixed to the lower arm 4. However, the upper rail 3 and the lower rail 4 can be made as one part and can be formed by pressing one plate. The seat supporting member may be dealt with as one part in the manufacturing and assembly process.

Figure 2:
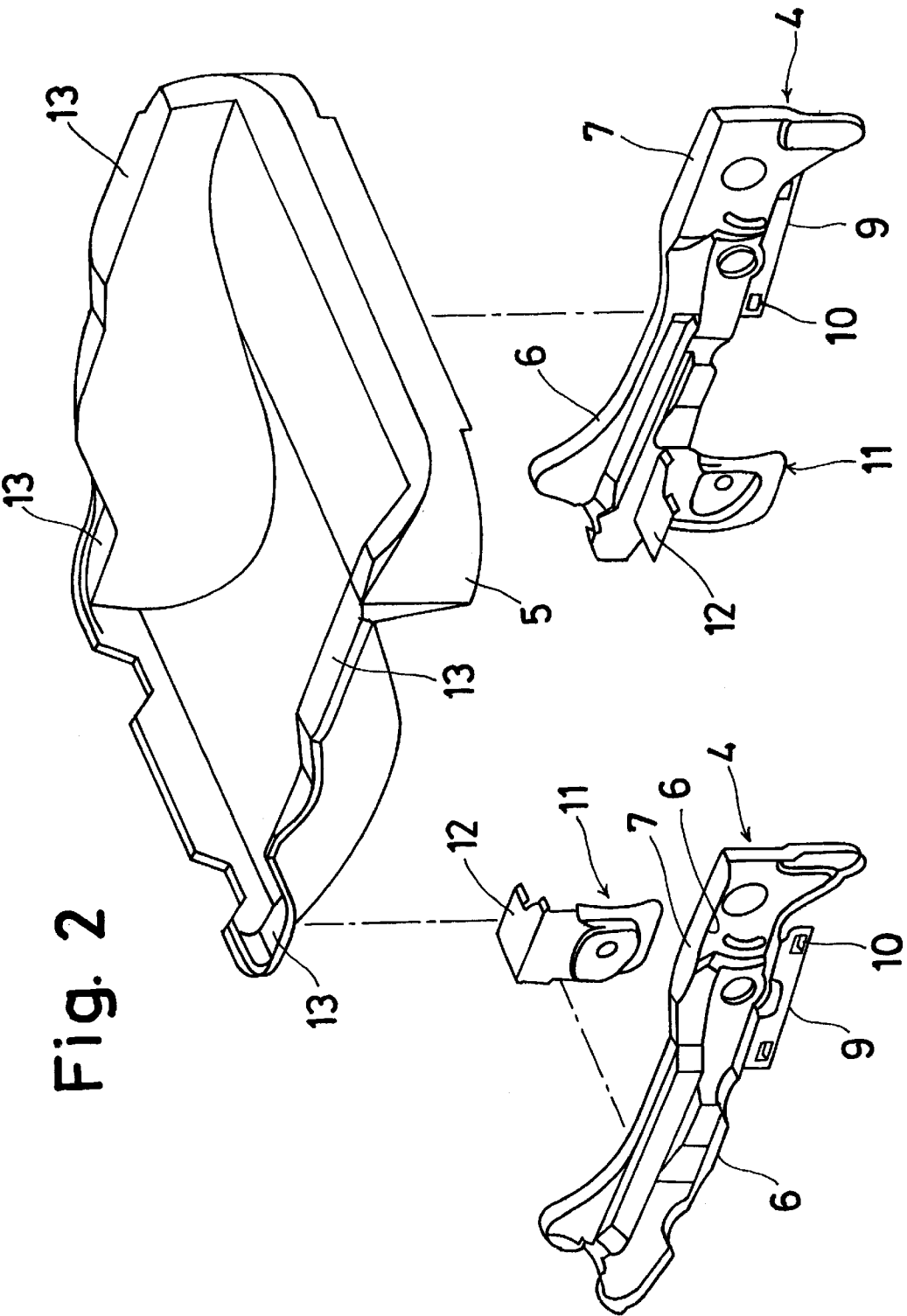
FIG. 2 is an exploded perspective view showing the seat frame according to the present invention.
Figure 3:
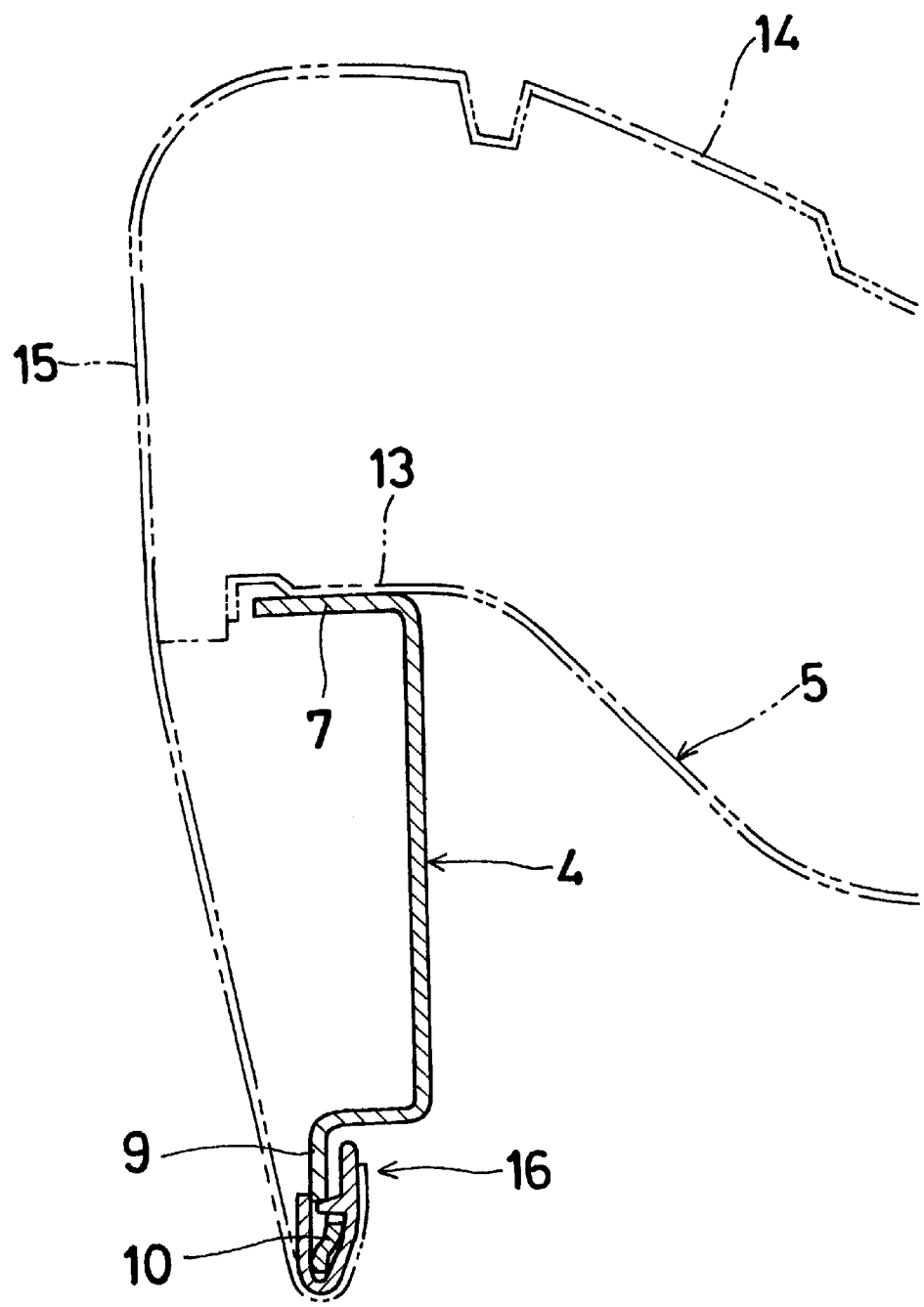
FIG. 3 is a cross-sectional view of a part of the seat device in accordance with the present invention taken along the section line III—III in FIG. 1.

As shown in FIGS. 1 and 2, each of the lower arms 4 which forms part of the respective seat supporting member is provided with a flange 6 extending generally about the peripheral edge and towards the outward side of the seat. The front upper portion of the flange 6 has a horizontally flat part 7, while the front lower portion of the flange 6 possesses a skirt portion 9 that extends downward. As shown in FIGS. 2 and 3, a pair of clips 10 is formed on the skirt portion 9.

An L-shaped bracket 11 is fixed on the inner surface of each lower arm 4 at the rear portion of the lower arm 4. As shown in FIG. 1, the brackets 11 serve a dual purpose. In one respect, the brackets 11 connect the lower arm 4 to the respective upper rail 3 near the rear portion of the lower arm 4 and the upper rail 3. In addition, the brackets 11 provide a horizontal surface or flange 12 on which is set the seat cushion frame (or pan) 5. Of course, the flange 12 could be formed as a part of the lower arm to eliminate the bracket 11.

The opposite side portions of the seat cushion frame (or pan) 5 have a pair of horizontal flat portions 13, 13 on which the flat portion 7 of the lower arm 4 and the flange 12 of the bracket 11 are set. The horizontal flat portions 13, 13 on each side of the seat cushion frame (or pan) 5 may be spaced apart from one another or may be formed as an elongated flat portion.

During assembly, the guide rails 2, 3, the bracket 11, and the lower arm 4 on each side are assembled as one part. After setting the flat portions 13, 13 of the seat cushion frame 5 (or pan) on the flat portions 7 of the lower arms 4 and on the flanges 12 of the brackets 11, spot-welding is performed at these contact portions. The flanges 6 and the flat portions 13, 13 protrude to the outer side of the seat, thus facilitating the spot-welding process.

As shown FIG. 3, a seat pad 14 is set on the seat cushion frame 5, and hooks disposed along the edge of the cover 15 are engaged with the clips 10 on the skirt portion 9. The seat assembly process is thus completed.

In the above described embodiment of the present invention, the seat supporting members are formed by the fixed combination of the upper rail 3 and the lower arm 4. However, the upper rail 3 and the lower arm 4 on each side may be connected by a pivot pin at their front or rear ends. In such an alternative, the flange 12 may be formed on the lower arm 4, with the bracket 11 being eliminated.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat device mounted in a vehicle comprising:
   a lower rail fixed on a vehicle floor;
   a seat supporting member slidably supported on the lower rail, said seat supporting member having a front upper portion and a rear part, said seat supporting member possessing a first horizontally extending flat portion at the front upper portion and a horizontally extending flange at the rear part that is disposed at a position lower than an upper edge of the supporting member; and
   a seat cushion frame having second and third horizontal flat portions, said second and third horizontal flat portions being welded to the first flat portion and the flange.

2. The seat device for a vehicle according to claim 1, wherein the first flat portion extends outwardly.

3. The seat device for a vehicle according to claim 2, wherein the flange extends inwardly.

4. The seat device for a vehicle according to claim 1, wherein the upper edge of said seat supporting member at the rear part is exposed above the seat cushion frame.

5. The seat device for a vehicle according to claim 1, wherein the seat supporting member includes an upper rail slidably supported on the lower rail and a lower arm fixed to the upper rail.

6. A seat device for a vehicle according to claim 5, wherein the flange is formed on a bracket which is fixed to the lower arm.

7. The seat device for a vehicle according to claim 5, wherein the flange is formed on a bracket which is fixed to the upper rail.

8. The seat device for a vehicle according to claim 5, wherein the flange is formed on a bracket which is fixed to the lower arm and to the upper rail.

9. The seat device for a vehicle according to claim 1, wherein the seat supporting member includes a downwardly extending skirt portion, and including clips formed on the skirt portion for being engaged by a cover positioned on the seat cushion frame.

10. The seat device for a vehicle according to claim 1, wherein the seat supporting member includes a part sliding on the lower rail and a part fixed to the seat cushion frame which are formed as one piece.

11. The seat device for a vehicle according to claim 1, wherein the seat supporting member has a vertical surface including plural ribs formed thereon.

12. A seat device mounted in a vehicle comprising:
    a lower rail fixed on a vehicle floor;
    a seat supporting member slidably supported on the lower rail, said seat supporting member having a front upper portion and a rear part, said seat supporting member possessing a first horizontal flat portion at the front upper portion and a horizontal flange at the rear part, the first flat portion and the flange being separated from one another; and
    a seat cushion frame having second and third horizontal flat portions, said second horizontal flat portion being welded to the first flat portion to form a first welded connection and the third horizontal flat portion being welded to the flange to form a second welded connection that is separate and spaced from the first welded connection.

13. The seat device for a vehicle according to claim 12, wherein the first flat portion extends outwardly.

14. The seat device for a vehicle according to claim 13, wherein the flange extends inwardly.

15. The seat device for a vehicle according to claim 12, wherein the flange extends inwardly.

* * * * *